(12) United States Patent
Kirkby et al.

(10) Patent No.: US 6,888,842 B1
(45) Date of Patent: May 3, 2005

(54) SCHEDULING AND RESERVATION FOR DYNAMIC RESOURCE CONTROL SYSTEMS

(75) Inventors: Paul Kirkby, Harlow (GB); Radhakrishnan Kadengal, Harlow (GB); David M Ireland, Chelmsford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/547,323

(22) Filed: Apr. 11, 2000

Related U.S. Application Data

(60) Provisional application No. 60/157,687, filed on Oct. 5, 1999.

(51) Int. Cl.[7] ................................................. H04L 12/28
(52) U.S. Cl. .......................... 370/414; 370/429; 710/56
(58) Field of Search .................................. 370/412, 413, 370/414, 415, 416, 419, 235, 235.1, 428, 429; 710/52, 53, 54, 55, 56, 57

(56) References Cited

U.S. PATENT DOCUMENTS

| | | | | |
|---|---|---|---|---|
| 5,926,458 A | * | 7/1999 | Yin | ............................. 370/230 |
| 6,101,193 A | * | 8/2000 | Ohba | ........................... 370/429 |
| 6,262,986 B1 | * | 7/2001 | Oba et al. | .................... 370/399 |
| 6,646,986 B1 | * | 11/2003 | Beshai | ...................... 370/230.1 |

* cited by examiner

*Primary Examiner*—Bob A. Phunkulh
(74) *Attorney, Agent, or Firm*—Barnes & Thornburg LLP

(57) ABSTRACT

A packet scheduling scheme schedules packets from a plurality of queues onto outgoing link. The scheme associates a weight and a virtual start time with each of the queues. Queues are selected, in order of the virtual start time, until a non-empty queue is selected. One or more packets are sent from the selected queue and then the virtual start time is updated, based on the length of the transmitted packet and the weight associated with the selected queue.

9 Claims, 10 Drawing Sheets

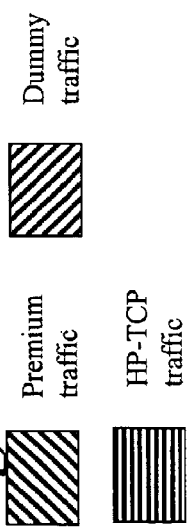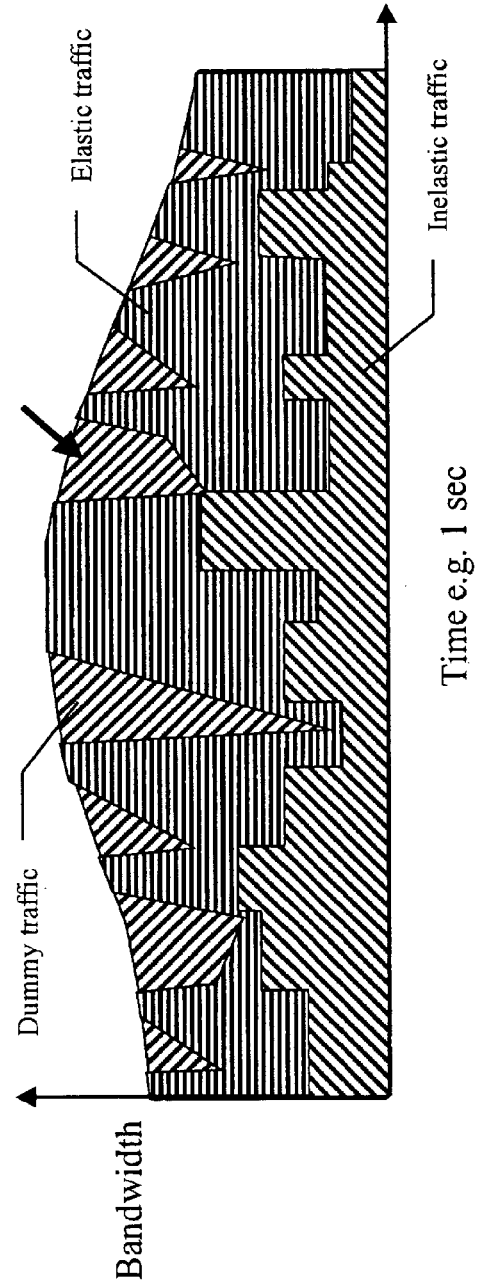
Fig. 7
Mixed elasticity trunks with dummy packet rate compensation to smooth total flow

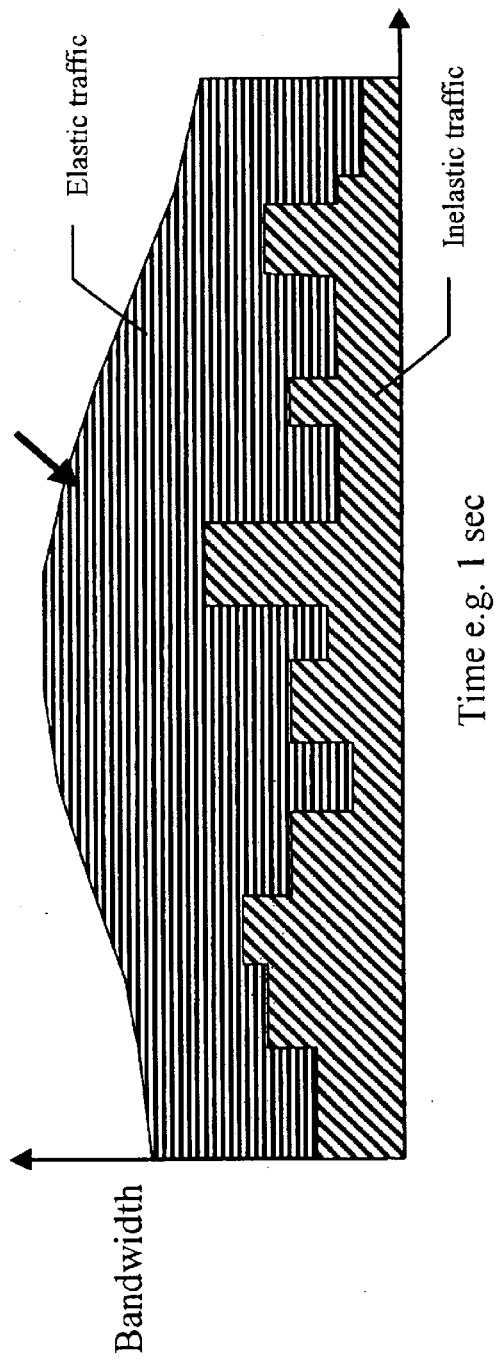
Fig. 8
Mixed elasticity trunks with packet rate compensation to smooth total flow without dummy packets

SCHEDULING AND RESERVATION FOR DYNAMIC RESOURCE CONTROL SYSTEMS

RELATED APPLICATION

This application is the non-provisional filing of provisional application No. 60/157,687, filed Oct. 5, 1999.

FIELD OF THE INVENTION

The present invention relates to a method and apparatus for scheduling and bandwidth allocation in a telecommunications network and a system incorporating the same.

BACKGROUND TO THE INVENTION

A key requirement of a broad band telecommunications network is that of scheduling bandwidth allocation in response to user demand to ensure efficient operation of the network and to maximise the revenue earning traffic that may be carried. Typically, this task is performed by the use of a scheduling algorithms.

Many scheduling algorithms are known, based on fundamental Weighted Fair Queuing concept. However, the basic Weighted Fair Queuing algorithm that is commonly used suffers from a number of disadvantages including:

computational complexity is high, it does not provide fairness when the output bandwidth fluctuates, it requires length of packets to be known it exhibits higher unfairness it causes higher delay to low throughput applications.

In an attempt to mitigate those disadvantages, some workers have employed Start Time Fair Queuing algorithm. This however, has the specific limitations that:

instantaneous nature of congestion is not accounted for and inter-packet delay can grow very large.

OBJECT OF THE INVENTION

The invention seeks to provide an improved method and apparatus for scheduling and bandwidth allocation in a telecommunications network.

SUMMARY OF THE INVENTION

According to a first aspect of the present invention there is provided a method of scheduling packets from a plurality of queues onto a outgoing link comprising the steps of: associating a start time with each of said queue s; selecting queues in turn responsive to said start times until a non-empty queue is selected; sending a packet from said selected queue; measuring the length of said packet; and associating a new start time with said selected queue responsive to said length of said packet.

In a preferred embodiment the method additionally comprises the step of: associating a weight with each of said queues; and the step of associating a new start time is additionally responsive to the weight associated with said selected queue.

Advantageously this supports partitioning of the output bandwidth according to bids, supports provision of quality of service guarantee and fairness even with variable capacity, does not need prior knowledge of the length of packet, supports incorporation of forward strategies based on policies, supports efficient use of bandwidth when scheduled flow gets blocked, mitigates the instantaneous nature of congestion, is adaptable to operate in hierarchical systems.

In a further aspect of the present invention there is provided a method of reserving bandwidth for a traffic flow in a telecommunications network comprising the steps of associating a minimum bandwidth reservation level with said flow; and if actual flow falls below said reservation level sending an indication of a difference between said actual level and said minimum reservation level as part of said actual flow.

In a first preferred embodiment said indication comprises a volume of dummy traffic indicative of said difference.

In a further preferred embodiment said indication comprises a packet containing an indication of said difference.

In this case the packet indicating the 'potential' flow may be sent to the control network.

The method may additionally comprise the steps of monitoring actual traffic flows including said indication; and dynamically allocating bandwidth to a traffic flow in the network responsive to a characteristic of said actual traffic flows.

The invention also provides for a system for the purposes of digital signal processing which comprises one or more instances of apparatus embodying the present invention, together with other additional apparatus.

In particular, there is provided apparatus for scheduling packets from a plurality of queues onto a outgoing link comprising the steps of: a start time associator for associating a start time with each of said queues; a queue selector for selecting queues in turn responsive to said start times until a non-empty queue is selected; a packet sender for sending a packet from said selected queue; a measure for measuring the length of said packet; a new start time for associator for associating a new start time with said selected queue responsive to said length of said packet.

In a preferred embodiment, the apparatus additionally comprises: a weight associator for associating a weight with each of said queues; and the new start time associator associates a new start time additionally responsive to the weight associated with said selected queue.

The invention is also directed to software for a computer, comprising software components arranged to perform each of the method steps.

In particular there is provided a program for a computer on a machine readable medium for scheduling packets from a plurality of queues onto a outgoing link and arranged to perform the steps of: associating a start time with each of said queues; selecting queues in turn responsive to said start times until a non-empty queue is selected; sending a packet from said selected queue; measuring length of said packet; associating a new start time with said selected queue responsive to said length of said packet.

There is also provided a program for a computer on a machine readable medium for reserving bandwidth for a traffic flow in a telecommunications network and arranged to perform the steps of: associating a minimum bandwidth reservation level with said flow; and, if actual flow falls below said reservation level sending an indication of a difference between said actual level and said minimum reservation level as part of said actual flow.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which:

FIGS. 7 and 8 are graphs illustrating smoother packet flow according to the present invention;

DETAILED DESCRIPTION OF INVENTION

Figure 1:
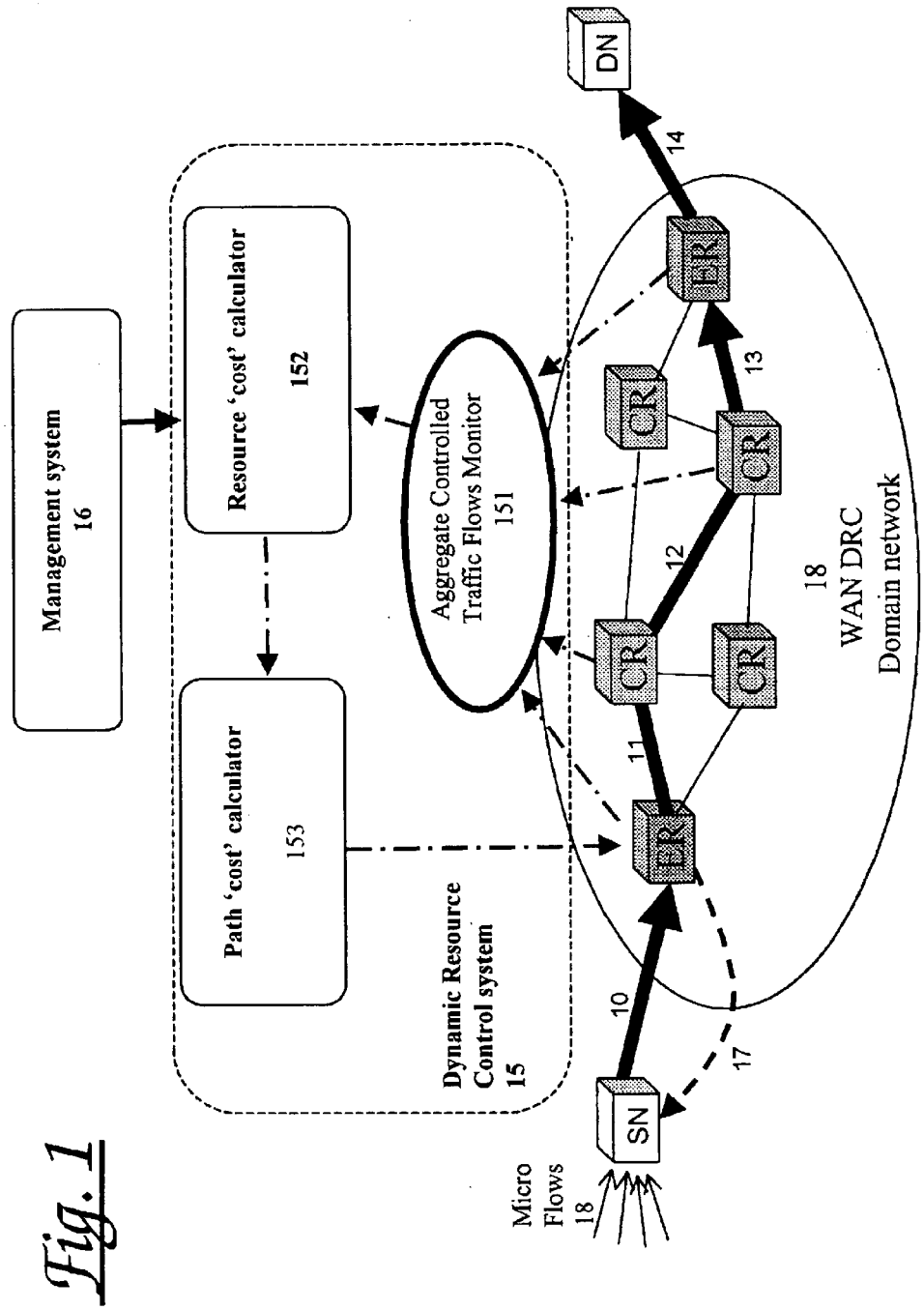
FIG. 1 shows the overall functional architecture of the dynamic resource control system.

Referring now to FIG. 1, there is shown an example of a network architecture in accordance with the present invention. The network comprises a number of interconnected core routers CR and edge routers ER.

An ingress gateway within each edge router controls incoming traffic flows 10 received from a source network SN. The incoming traffic flows are derived from micro flows 18 received by the source network; the micro flows being controlled by explicit or implicit (e.g. packet loss) signalling 17 from the edge router ER.

Traffic received at edge routers is routed across the network along paths comprising one or more links 11–13 to its destination, network DM via further link 14.

A Dynamic Resource Control (DRC) System 15 comprises an aggregate controlled traffic flow monitor 151 which measures aggregate controlled traffic flows at each resource CR, ER in the network.

It also comprises a resource 'cost' calculator 152 which calculates 'n-price' of each resource as a function of the measured traffic and set control level.

It further comprises a path 'cost' calculator 153 which calculates 'n-price' of each path as a function (e.g. sum) of the n-price of each resource on the path.

The DRC system may be centralised or distributed according to the response time required from the system.

A management system 16 may be coupled to the DRC system 15 (e.g. via the resource 'cost' calculator) and provide set control levels for each resource in the system.

In this part of the system architecture the rate of flow of high priority elastic (TCP) traffic from each of a set of buffers is controlled by an output port scheduler. Note that for this high priority elastic traffic the TCP traffic ingress flow is controlled by packet discard in the RED queue. This has been chosen as a good example of an elastic traffic flow. The demonstration is aimed at showing that we can feed back remote link 'congestion n-price' information to the rate control element determining the rate of the aggregate TCP flows along each path. Using DRC algorithms we aim to demonstrate that high priority traffic can be controlled to less than 100% utilisation in all the remote links, and yet the overall user utility will be maximised. Typically there are four classes of traffic:—

Class one is high priority (inelastic) real-time traffic to be treated with the expedited forwarding per hop behaviour or top priority assured forwarding in the core routers. (Top buffer in FIG. 1 output scheduler) The volume of this type of traffic is separately controlled by earlier admission controllers. (Being inelastic these flows prefer a yes/no admission decision to being allocated less bandwidth than they requested.) The admission controller operates in such away that the aggregate class one traffic in any link in the network is less than the pre-set control level for total high priority (class one plus class two) traffic (say 10% to 60%) of any link capacity.

For high priority elastic traffic (class two), the aggregate flow rate $x_{ci}$ scheduled onto each output path is controlled by a controlled weighting factor $w_{ci}$ (where the subscript 'i' denotes the path number and the subscript 'c' denotes the class number). The path is the complete path shown in FIG. 1 from the ingress node to the egress node. Note there are many paths per output port. (They could be implemented for instance as MPLS paths).

Class three is traditional best efforts traffic and is scheduled on a per port basis with packet discard controlling the ingress rate in overload.

Class four is a dummy packet stream that may occasionally be necessary to achieve the desired scheduler behaviour. (discussed in more detail later)

Below we describe a method of calculating and continuously updating the value of $w_{ci}$ in such a way that maximum use of the remote links is made within the constraint that the total high priority traffic (class one plus class two) must not exceed the management system defined pre-set link occupancy. In this way this high priority elastic traffic is treated in such a way that it is guaranteed never to be delayed significantly by congestion beyond this ingress controller gateway. The paths form 'dynamic elastic trunks' that breathe in and out in bandwidth in such a way as to maximise end user utility and network revenue. We are effectively automating the traffic engineering of a VPN carrying the high priority traffic by applying carefully devised sets of policies. Remote congestion information is returned to the ingress controller in the form of a path source n-price $p_i^s$. The term n- price is a DRC term to indicate that the price is a network control signal price and not a real price that anyone gets charged for. This price $p_i^s$ is the sum of all the link n-prices $p_i$ in the path i. Each link n-price increases when the aggregated high priority traffic passing through it exceeds pre-set link control level and decreases when it is less. To minimise stability issues, we prefer a time constant, say 1 second on the rate at Which link n-price, path n-price, and $w_{ci}$ can vary. This negotiation time can be as long or short as chosen, limited at the short end by about two round trip times (RTTs).

Offset Adjusted Fair Scheduler:

The scheduler is designed such that it is constantly trying to schedule traffic fairly according to their weights using the following method.

Let $p_f^j$, $l_f^i$ and $r_f^i$ denote the $j^{th}$ packet of flow f, its length and its bid respectively. Let $A(p_f^j)$ denote the time at which the $j^{th}$ packet is requested (comes to the head of the queue). If the flow remains runnable, it is the time at which its previous packet finishes.

The following assignments hold:
1. Virtual time, $$v(t) = S(p^j_{f_{IN-SERVICE}})$$

when CPU is busy $$\max\{F(p^j_f)\}$$

when CPU is idle

2. Virtual start time, $$S(p^j_f) = \max\{v(A(p^j_f)), F(p^{j-1}_f)\}$$

3. Virtual finish time, $$F(p^j_f) = S(p^j_f) + \frac{l^j_f}{r^j_f}$$

Service the flows in the increasing order of virtual start time. Ties are broken either arbitrarily or according to a policy. The bid can be changed, if required, by the ingress controller to take care of the instantaneous nature of congestion.

The algorithm is invoked once per packet transmitted.

The virtual start time of a blocked flow is updated in the background and is carried along the running flow. This is done for the following purpose:

Assume flow B is being served and flow P is scheduled for a time in future, $t_r$. Assume flow B got blocked. Now the bandwidth will be taken over by flow P. When flow B becomes runnable, it captures the service. But flow P will now be scheduled for a time later than $t_r$. Four things are to be noted here:

Flow P gets expedited service when flow B is blocked

Flow P relinquishes control on demand from flow B

Overall fairness is maintained.

Flow B does not give away the effective bandwidth share even though it was not ready on time.

Bandwidth can be 'stolen' from B when it has no traffic.
Bandwidth stealing can be achieved by assuring service to flow P at the previously scheduled time $t_r$. In this case, flow B will have to give away the service time allotted to it when it gets blocked. This share of time will not be given back to flow B.

This can be achieved by updating the virtual start time of B when it is blocked, as follows:

$$S(p^j_B) = S(p^{j-1}_B) + (F(p^j_P) - F(p^{j-1}_P)) + \frac{l^j_P}{r^j_B}$$

where i is the virtual packet count for flow B for each packet of flow P.

The technique can be modified to achieve near ideal fairness, at the cost of increased computation:

In this case the adjacent flow gets the bandwidth share absolutely free. This could fairly be distributed among all the flows by incrementing the start time of this adjacent flow by an amount that would spread the slot evenly. A simple case would be to increment it by $$\left(\frac{l^j_f}{r^j_f}\right) / \text{number\_of\_flows}.$$

The scheduler is such that providing one or more packets are always available in all of the buffers of that feed into the output scheduler.

The average aggregate flow on each path:

$$x_{ci} = C_L \frac{w_{ci}}{\sum_{ci} w_{ci}} \text{ bytes/second} \qquad (1)$$

Where $C_L$ is the output link capacity and $$\sum_{ci} w_{ci}$$

is the sum of all the weights of all the queues.

For this high priority elastic class of traffic (class 2 here) we want the flows $x_{ci}$ to be proportional to the weights $w_{ci}$. There is a problem with this type of scheduler if other flows are blocked so that some of the scheduler's queues are empty. In its basic form this scheduler leaps to next highest priority packet if it finds a queue empty. If a queue stays empty for long then the average rate of the remaining active queues increases to fill the total output port capacity. This is called a work conserving scheduler. This ingress controller application requires that the output scheduler is not work conserving for class two traffic. We want to modify the algorithm so that for every fully active class two queue, $x_{ci}$ is always proportional to the weights $w_{ci}$ irrespective of which other flows are fully or partially blocked. In this way the weight $w_{ci}$ is acting as the key parameter in an ingress traffic flow controller controlling the sustained byte transmission rate on each path (referred to henceforth as the committed information rate on the path or CIR).

Lower classes of traffic such as best efforts traffic (class 3) can be scheduled in a work conserving manner because it does not matter if such traffic overloads distant routers.

Figure 2:
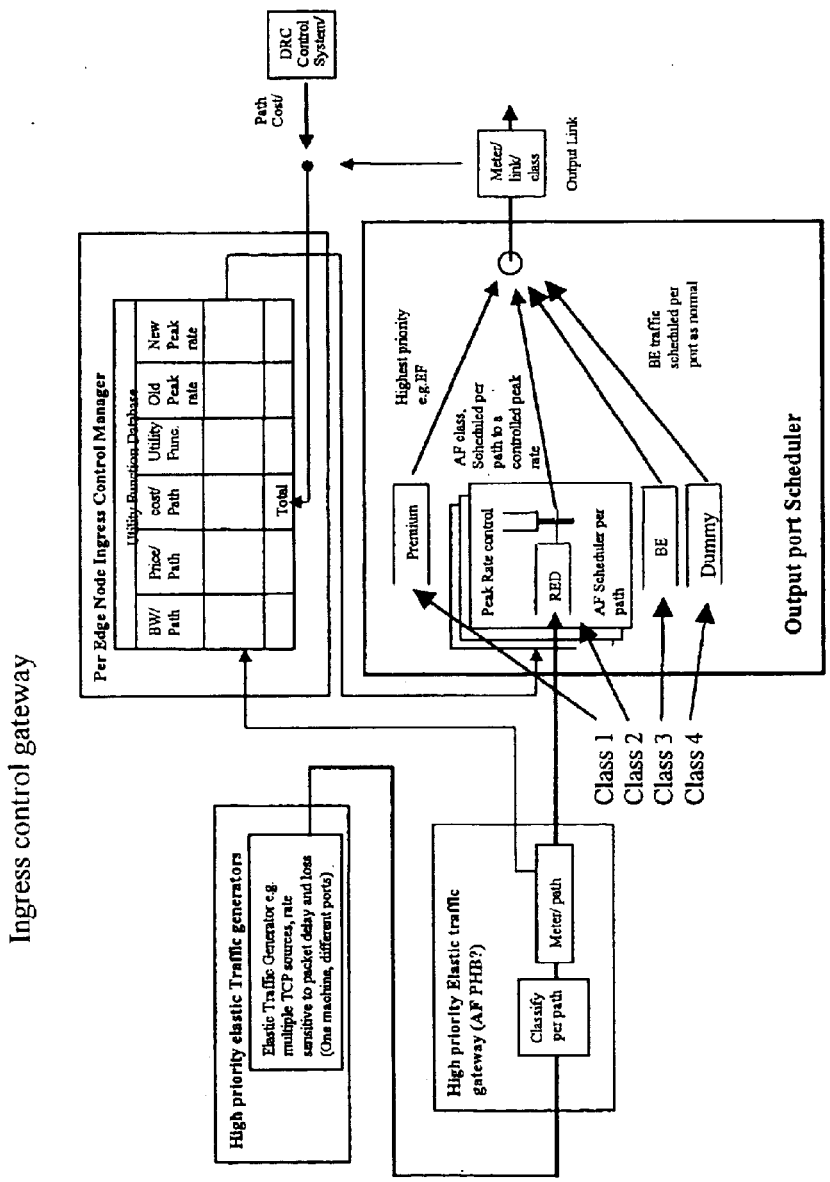
FIG. 2 shows in more detail the system diagram for the ingress control gateway.

A simple embodiment to the algorithm is to always give unused 'virtual time credit' from blocked class two packet time slots to class three, if there are no class three packets give it to class four. Where virtual time credit is the defined in the accompanying description of the basic scheduling algorithm. The dummy packets can either be real packets that carry arbitrary data, but are marked in some way to enable a packet discard unit after the scheduler to delete such packets. (see FIG. 5) Alternatively it is simply a conceptual mechanism for telling the scheduler to idle for a period equivalent to that at which a dummy packet was sent. The length of dummy packet is not important as the scheduler algorithm will arrange that the amount of idle time is appropriate. The weighting allocated to the dummy (class four) packet stream is such as to keep $$\sum_{ci} w_{ci}$$

constant. Where this represents the sum of the weightings for all the queues of all the classes. (No packet discard unit shown in FIG. 2)

Consider first the case where there is overall network congestion and plenty of TCP traffic on each path. Controlled by packet loss from the RED queues, user TCP algorithms will have allowed the flows on each path to increase until the average flow on each path is as high as the link scheduler algorithm allows. That is to say every path flow is saturated with TCP traffic up to the path scheduled committed information rate (CIR). The rate of this will be set by the scheduler algorithm as defined in Equation (1) The flow of class 2 traffic/path:

$$x_{2i} = CIR_{2i} = C_L \frac{w_{2i}}{\sum_{ci} w_{ci}} \text{ bytes/second} \quad (2)$$

The question is how to set $w_{2i}$ to optimise resource usage.

In DRC work a perfectly elastic source states its willingness to pay WtP (the units are arbitrary but for clarity referred to here as n-cents/sec). The network carries out the DRC optimisation for all the WtPs on all the paths and returns an n-price/unit bandwidth (in units of (n-cents/sec)/(byte/sec)=n-cents/byte say) to the source. The source is then permitted to transmit a flow at a rate:—

$$x_{2i} = \frac{WtP_{2i}}{p_i^s} (n\text{-cents/sec}) / (n\text{-cent/byte}) = \text{bytes/sec} \quad (3)$$

The actual trunk flow rates can then be managed by managing the WtPs on each path. The DRC optimisation that sets path price ensures that the resources are shared in a proportionally fair manner across the whole network. Network management can easily control the way the resources are shared by adjusting the WtPs along each path, confident that the DRC automated n-price setting will ensure that no resource is overloaded. It is easy for instance to allocate a greater share of the total WtP to a particular set of paths exiting a particularly important set of users such as a set of servers or a highly paying business access site.

For simplicity, we assume that the network manager wishes to treat all users of this class two traffic service equally. In the first case let us assume that we want to manage the resource allocation for this high priority class of traffic according to the following simple policies.

All ingress flows considered equal at the path level—irrespective of how many TCP flows or users are using the path Total willingness to pay constant on a per ingress node basis.

In the case that all the n paths leaving the ingress node are saturated with TCP traffic These two policies translate into:—

$$WtP_{2i} = WtP_{TOT2}/n \quad (4)$$

where $$WtP_{TOT2} = \sum_{i=1 \to n} WtP_{2i}$$

is the total willingness to pay for this ingress node for class 2 traffic.

Taking equations 2,3 and 4 together it is deduced that the weighting factor to apply to the output port scheduler is $$w_{2i} = \frac{WtP_{TOT2}}{n \times p_i^s} \times \frac{\sum_{ci} w_{ci}}{C_L} \quad (5)$$

This equation says that the scheduler output port weighting is inversely proportional to path price (similar to the multiplicative rate decrease of TCP in response to congestion) and proportional to the total weighting given to class two traffic.

In cases where all weights are equal, scheduling is no longer dependent on the weights but rather on the start times of the queues alone.

These concepts can be further extended to improve the overall performance of the system.

Figure 3:
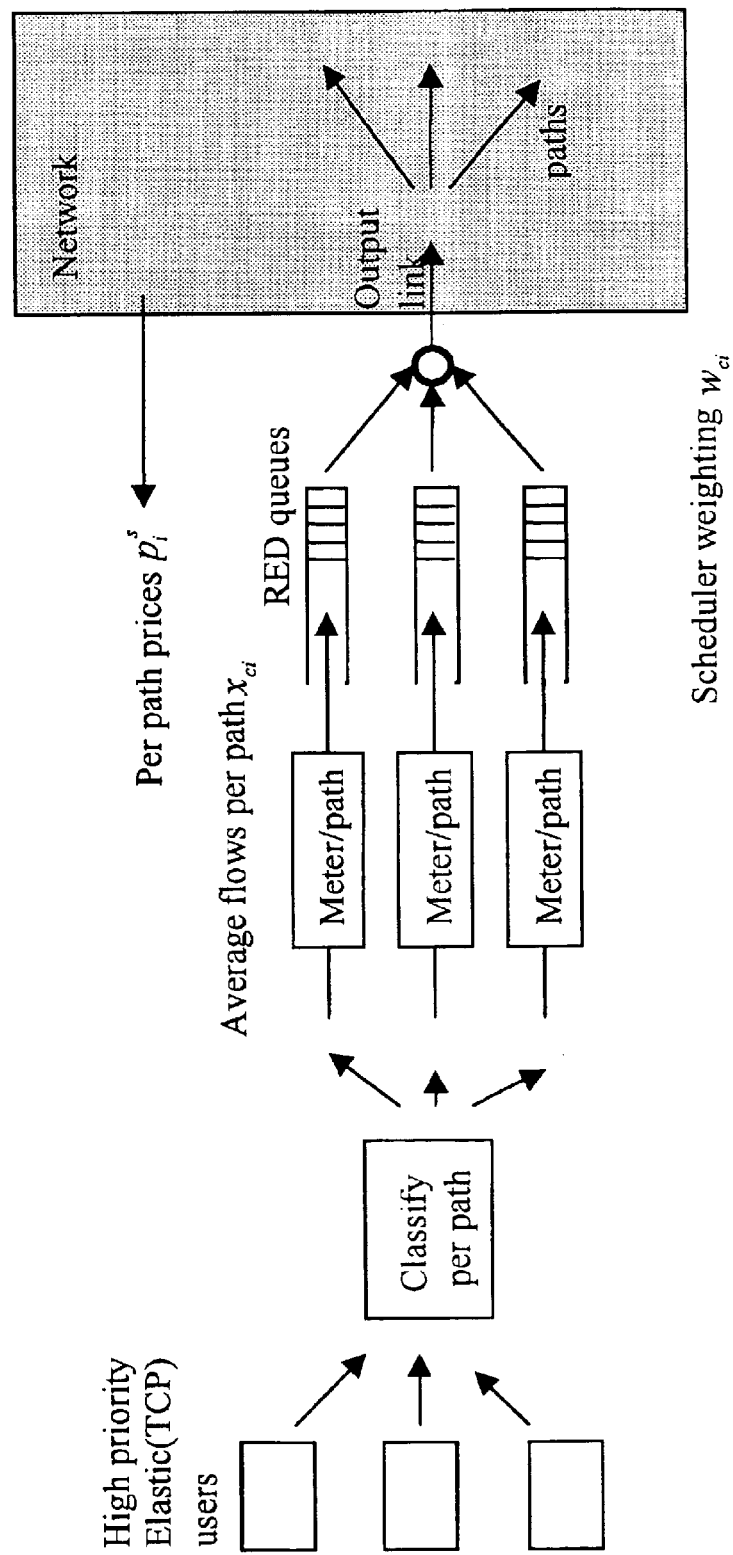
FIG. 3 shows further detail of the arrangement of FIG. 2.

FIG. 3 shows a modification in which the weighting of class two traffic on a path is continuously adjusted so that the sum of class one and class two traffic varies only slowly with time. Sudden jumps on(e.g. on millisecond to second timescales of premium traffic flow are compensated by momentary reductions in the class two elastic traffic so that the sum of the high priority (class One and two traffic on the path changes only slowly. This is to keep traffic flow rate change within the within the frequency response of the DRC negotiation feedback control mechanism time response. (taken as 1 second in this example, but all these suggested times could be scaled down or up without changing the principle.) NB the correction only need to be approximate say 10% accuracy as there is margin for error in the control mechanism at the routers.

Figure 4:
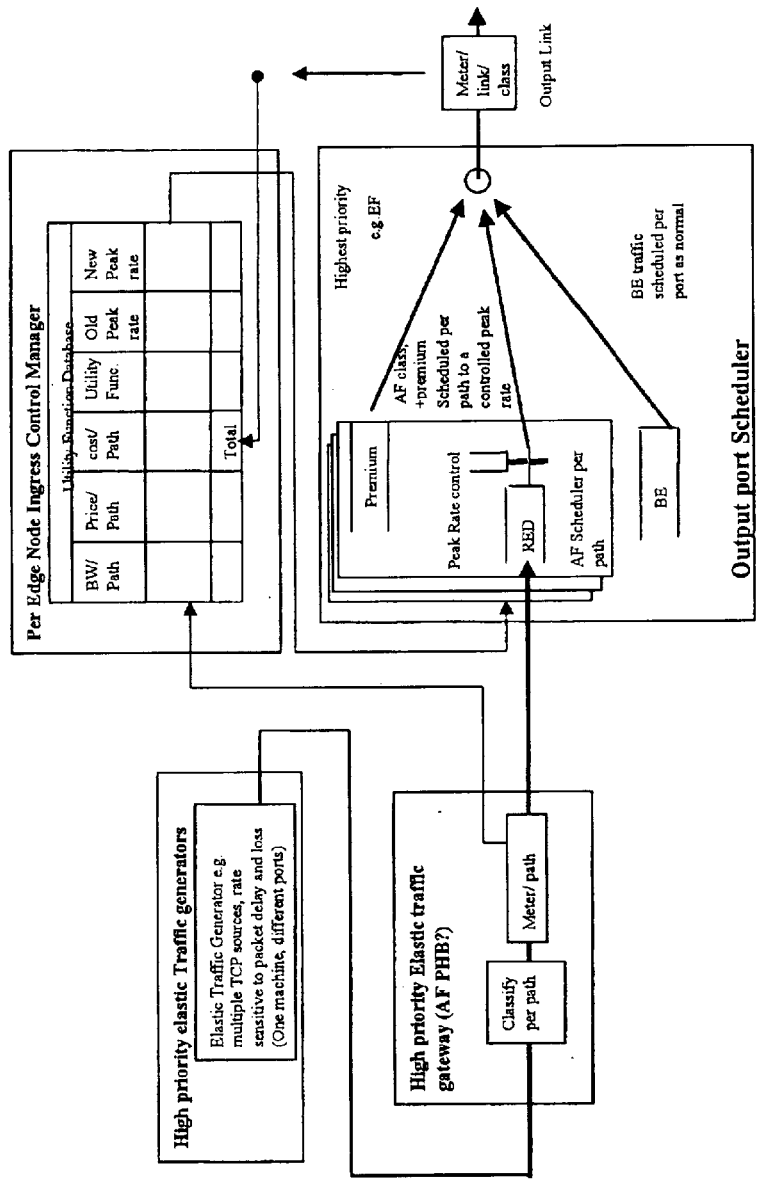
FIG. 4 shows a modified arrangement.

In FIG. 4 the scheduling algorithm is modified so that the sum of premium plus HP Elastic traffic is approximately smoothed to fluid flow along path. The resulting smoothed flows is illustrated in FIG. 7.

Figure 5:
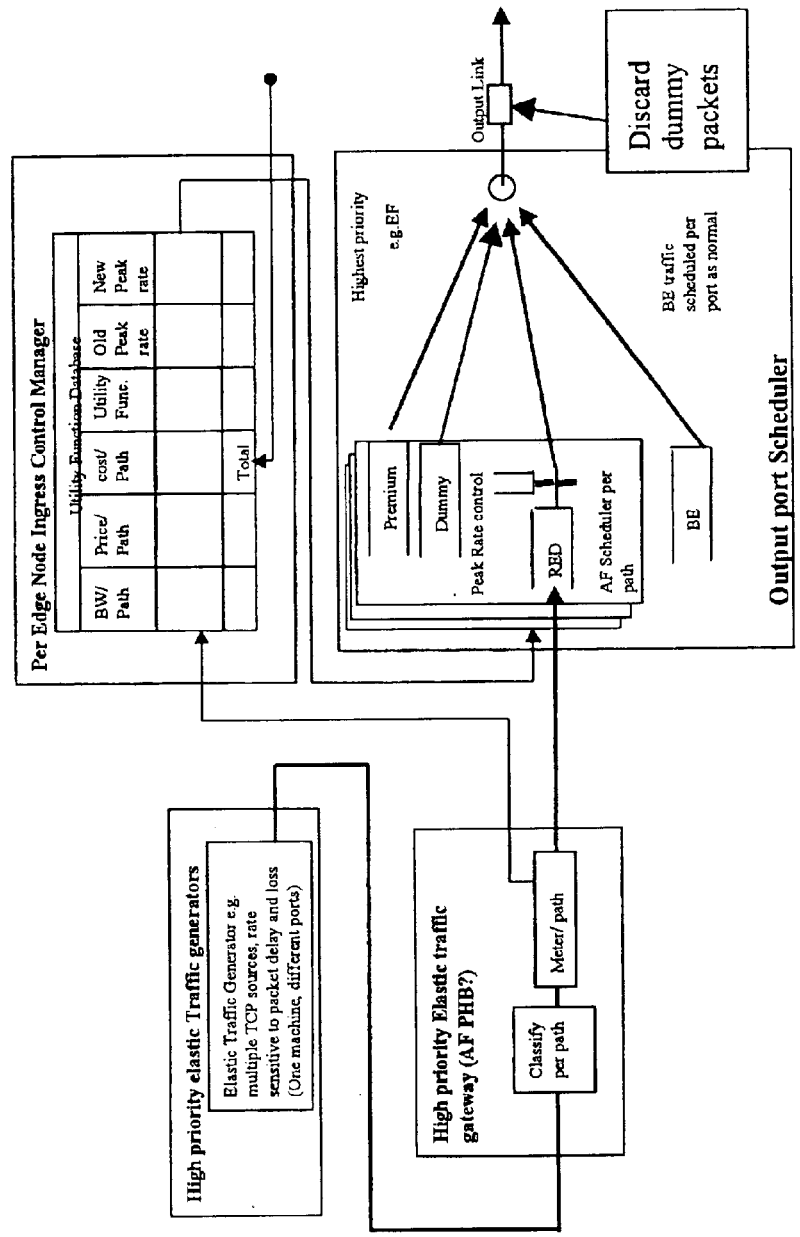
FIG. 5 illustrates the use of dummy packets internal to the ingress gateway.

FIG. 5 shows the use of dummy packets, as described earlier, for ensuring that the scheduler control packet flows of an absolute rather than relative level. In this case dummy packets are discarded after the scheduler. This converts a proportional rate scheduler (work conserving) into an absolute rate scheduler (non-work conserving)

In the arrangement of FIG. 4 Dummy Packets are added purely to enable the scheduler to control per path flows independently of sum of packet flows. That is, to convert proportional rate scheduler (work conserving) into an absolute rate scheduler (non-work conserving)

Figure 6:
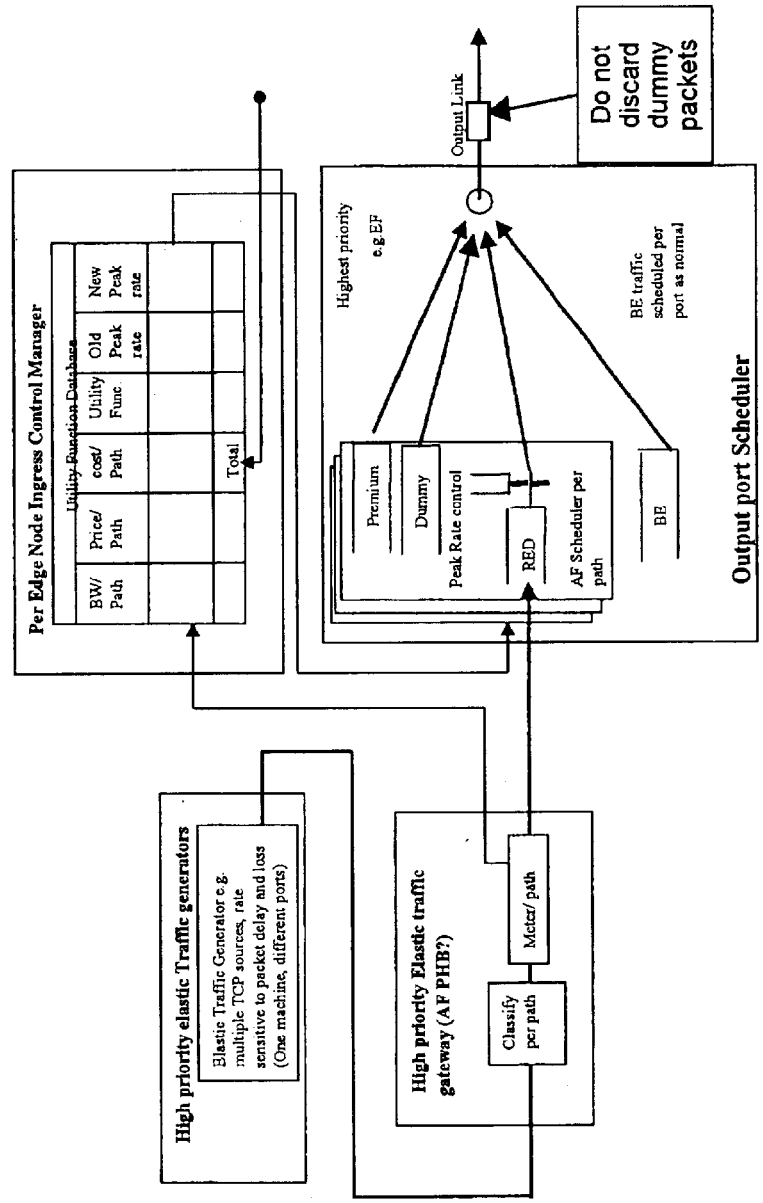
FIG. 6 illustrates dummy packets being injected into the network along the data path.

FIG. 6 shows the use of dummy packets that are not discarded and are used to 'fill in packet flows' that consist of arbitrary mixtures of premium and high priority elastic traffic as illustrated in FIG. 7, the reason the user may choose to send such packets is to ensure that the simple core routers, which are measuring traffic flow to set n-price, are not misled into thinking the traffic flow is lower than a certain control value that the edge router can set. Using this mechanism the Edge Router can maintain, increase or decrease its 'reserved bandwidth'. When it subsequently receives a burst of high priority traffic it can then substitute some or all of the dummy stream of traffic and hence produce less unexpected jump in total high priority traffic at the core routers.

FIG. 7 thus shows how the Dummy Packet flow can be added so that sum of premium plus HP elastic plus dummy traffic is approximately smoothed to fluid flow approximation. (dummy packets not discarded). Simple metering in the subsequent standard routers gives the sum of real and dummy packet flows. The dummy packet flows can then be used to reserve bandwidth (by using it) on the DRC bandwidth negotiation timescale (e.g. 10 sec down to a few RTTs).

Figure 9:
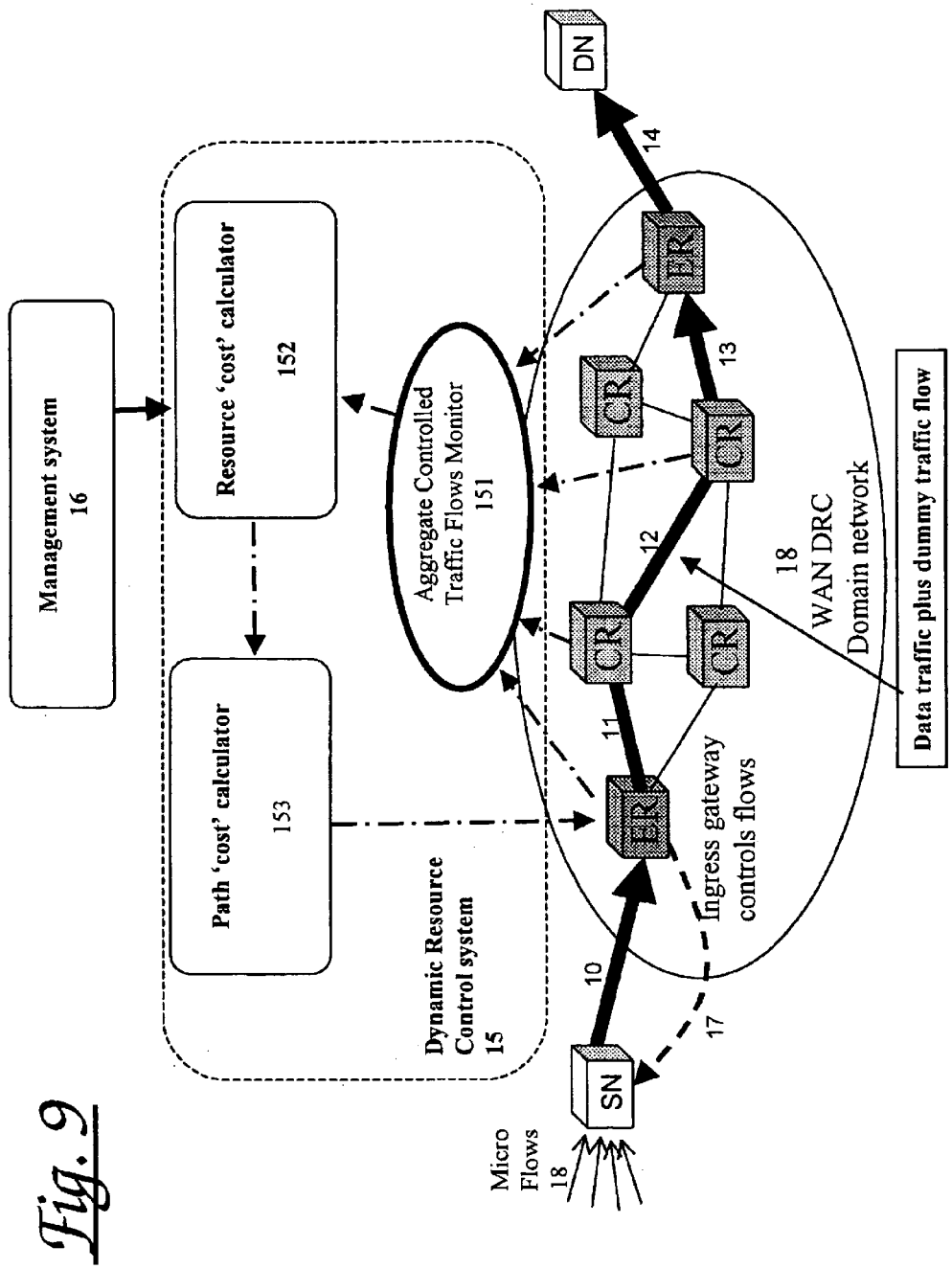
FIG. 9 shows how dummy packet flow is seen by Dynamic Resource Control (DRC) system as part of the real data traffic flow in accordance with the present invention.

An example of the overall view of such a DRC control system carrying real plus dummy data traffic on each path is shown in FIG. 9. This figure emphasises how the DRC feedback control system cannot distinguish between real and dummy flows in setting the n-price of each resource and behaves as if the control data stream were a single flow. This single flow however consists of the real data plus the dummy packet flow.

FIG. 8 shows the case where there is sufficient elastic (e.g. high priority TCP traffic) to smooth the total flow without the necessity of adding dummy packets. This is clearly less ideal than the case shown in FIG. 7 but it is none the less better than not smoothing the HP-TCP traffic.

In a further refinement it is proposed to use virtual dummy packets in network with special routers that recognise their symbolic significance e.g. as 500 packets. The spare bandwidth then can be used by local best efforts traffic in core routers. These virtual dummy packets are for instance suitably modified versions of ATM or MPLS resource management packets or IP control packets. The modification would include an indication that they are a special type of packet that represents a number of real packets and a field to indicate the number and size of the real packets they represent, perhaps measured as total number of bytes they represent.

Figure 10:
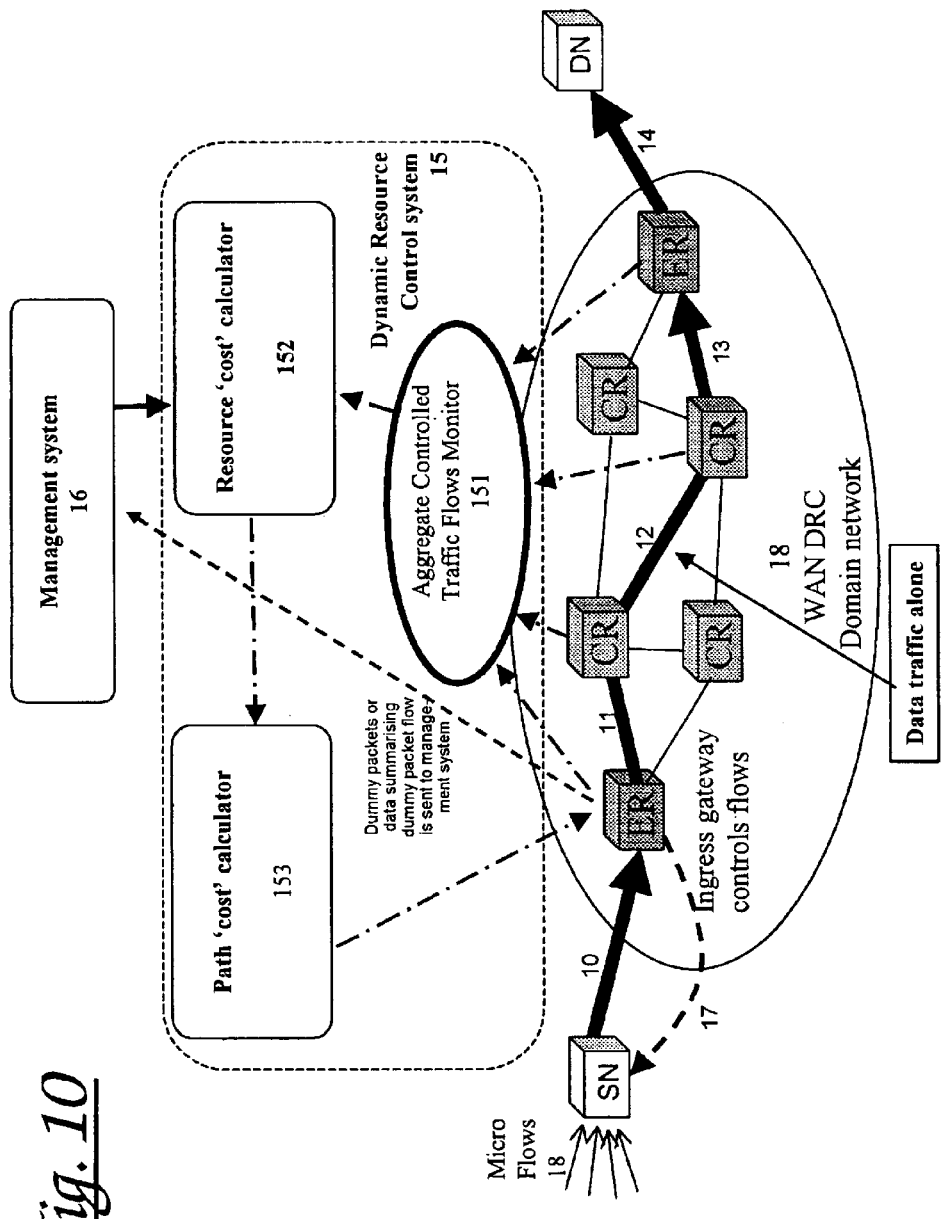
FIG. 10 shows how the dummy packet data can be sent to the management system and used to dynamically modify the set points in accordance with the present invention.

In FIG. 10 we show an alternative arrangement for achieving a similar overall system performance. In this case instead of adding the dummy data stream to the real data packet stream, the dummy data is sent to the part of the management control system that sets the control levels in each resource. The management control system then dynamically adjusts the control set point of each resource to allow for the magnitude of the aggregated dummy packet flow that it calculates flowing thorough each resource. To achieve this, the management system needs to be aware of the network topology so it can allocate ingress flows to the correct core router resources. This system requires a larger amount of signalling traffic than the system of FIG. 9 which dummy packets go with the data flows. In a further refinement it may be desirable to 'smooth' the dummy flow data to a slower response speed and send information that represents this smoothed version of the dummy flow rate data at longer time intervals. This will minimise signalling traffic to the management system but obviously not allow the overall control system to track and control the changes in demand so accurately and rapidly. It will be an engineering compromise to decide what the optimum configuration, control and smoothing time constants are. It should be noted that these two systems of FIGS. 9 and 10 are conceptually very similar: in one case the dummy traffic is added to the data traffic and the control set points is fixed; in the other the dummy traffic is subtracted from a fixed reference control level by the management system and used to dynamically adjust the actual control set point of each resource.

It should be noted that in both systems more or less sophisticated modifications can be made to the instantaneous assumed dummy traffic load in order to make more efficient use of the resource available. So for a system with a measured aggregate 10 Mbit/sec dummy traffic flow through a resource, a policy may be employed to count it as much less so that more real traffic can be allowed through. This would then start to risk the possibility of unexpected surges in traffic that the ingress controllers think is 'guaranteed' causing momentary overload at certain resources.

The network operator could monitor the occurrence of such overloads and adjust the policies to suit his business aims.

Any range or device value given herein may be extended or altered without losing the effect sought, as will be apparent to the skilled person for an understanding of the teachings herein.

What is claimed is:

1. A method of scheduling packets from a plurality of queues onto a outgoing link comprising the steps of:
    associating a weight with each of said queues;
    associating a start time with each of said queues;
    selecting queues in turn responsive to said start times until a non-empty queue is selected;
    sending a packet from said selected queue;
    measuring the length of said packet; and
    associating a new start time with said selected queue responsive to said length of said packet and the weight associated with said selected queue.

2. A method according to claim 1 further comprising updating a start time of a queue when another queue is blocked.

3. A method according to claim 2 wherein the step of updating the start time of a queue is by an amount of time that would have been allocated to the queue that is blocked.

4. A method according to claim 2 wherein the step of updating a start time of a queue comprises distributing the time that would have been allocated to the queue that is blocked among all other queues.

5. A method according to claim 2 wherein there are a plurality of classes of traffic and wherein the step of updating a start time of a queue comprises updating the start time of a queue of a lower class of traffic.

6. A method according to claim 5 wherein, if there are no queues of the lowest class with waiting packets, the time that would have been allocated to the blocked queue is allocated to dummy traffic.

7. Apparatus for scheduling packets from a plurality of queues onto a outgoing link comprising the steps of:
    a weight associator for associating a weight with each of said queues;
    a start time associator for associating a start time with each of said queues;
    a queue selector for selecting queues in turn responsive to said start times until a non-empty queue is selected;
    a packet sender for sending a packet from said selected queue;
    a measure for measuring the length of said packet;
    a new start time associator for associating a new start time with said selected queue responsive to said length of said packet and the weight associated with said selected queue.

8. A telecommunications system embodying at least one instance of apparatus according to claim 7.

9. A program for a computer on a machine readable medium for scheduling packets from a plurality of queues onto a outgoing link and arranged to perform the steps of:
    associating a weight with each of said queues;
    associating a start time with each of said queues;
    selecting queues in turn responsive to said start times until a non-empty queue is selected;
    sending a packet from said selected queue;
    measuring length of said packet;
    associating a new start time with said selected queue responsive to said length of said packet and the weight associated with said selected queue.

* * * * *